April 15, 1958 — E. B. FERNBERG — 2,830,345

FASTENER

Filed July 14, 1954

Inventor
Eric B. Fernberg
by Malcolm W. Fraser
attorney

United States Patent Office

2,830,345
Patented Apr. 15, 1958

2,830,345

FASTENER

Eric Birger Fernberg, Northwood, England, assignor to F. T. Products Limited, London, England, a British company Application July 14, 1954, Serial No. 443,365

Claims priority, application Great Britain July 20, 1953

2 Claims. (Cl. 24—73)

The present invention relates to an assembly of a fastener holding a piece of rubber or the like to an apertured panel.

It is common practice at the present time to form an automobile door with a peripheral flange which fits in a correspondingly shaped recess formed around the door opening in the body panel and to use a strip of rubber, pinched between the door flange and the body panel, to exclude draughts and rain. Usually the rubber strip is secured around the whole, or the major part, of the periphery of the door, as by gluing for example.

It is an object of the present invention to provide an improved method and means for securing such a rubber strip to the door panel.

Another object of the invention is to provide a fastener which can be passed through and engaged in a hole in a panel in a situation where there is a certain amount of obstruction behind the panel.

Another object is to provide more positive holding means than adhesive for securing a resilient weather strip to a metal panel.

According to the invention there is provided a resilient fastener comprising a single rectangular strip of metal having bends about a series of parallel lines so that its central portion is in the form of a U-shaped stud with a snap-engaging elbow and having its ends in the form of a pair of opposed inwardly directed hooks, the strip also having, at the junction of the stud with each hook, cut-away portions constituting sloping shoulders, the narrow portion of each shoulder being adjacent a hook.

Figure 1:
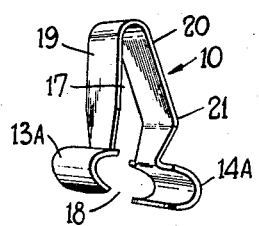
Figure 2:
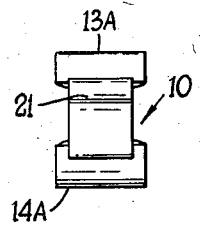
Figure 4:
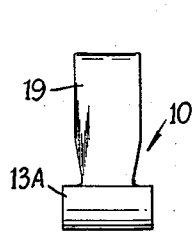
Figure 3:
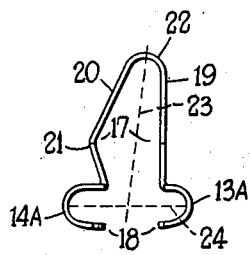
Figure 5:
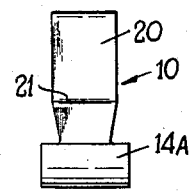
Figure 6:
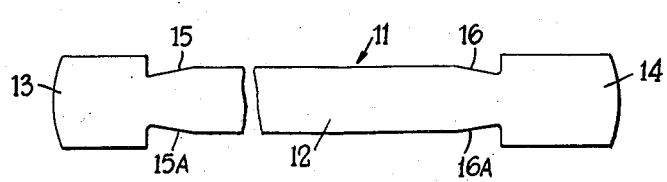
Figure 7:
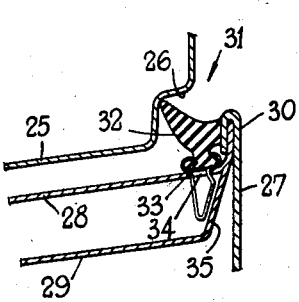
Figure 8:
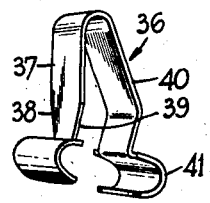

A preferred form of the invention will now be described with reference to the accompanying diagrammatic drawings, in which:

Figure 1 is a perspective view of a fastener,

Figures 2, 3, 4, and 5 are respectively a plan, front elevation and left- and right-hand end elevation of the same fastener, Figure 6 shows a metal blank from which the fastener may be made, Figure 7 is a horizontal section taken through a portion of a car door and body panel, showing also a fastener and rubber strip, Figure 8 is a perspective view of a modified form of fastener which can be used as an alternative to that shown in Figures 1 to 5, and Figure 9 is a side elevation of a third form of fastener.

The fastener indicated generally at 10 in Figures 1 to 5 is formed from the metal blank shown at 11 in Figure 6. It will be seen that the blank consists of a central portion 12 of uniform width, two end portions 13 and 14 which are of equal width greater than that of the central portion, and one of which, 14, is longer than the other, 13. The blank is also formed with two pairs of sloping shoulders 15, 15A and 16, 16A located respectively at the joinder of each end portion with the central portion.

The metal strip is fashioned to the shape shown in Figures 1 to 5 so as to comprise a snap-engaging stud 17 and a base 18. The stud has one limb 19 rectilinear and the other, 20, formed with an outwardly directed elbow 21, a closed nose 22 being formed between the two limbs. The two end-portions are bowed into the shape of hooks 13A and 14A of the same depth, but one (14A) being a little longer than the other.

An important structural feature of the invention, the purpose of which will be explained later, is that the major axis 23 of the stud 17 is not inclined at 90° to the major axis 24 of the base 18, but is oblique thereto at an angle of about 70°–75°, although the limb 19 may be at 90° to the axis 24.

The finished fastener is rendered resilient, and it may be rust proof, in any known or suitable manner.

At 25 in Figure 7 is shown a portion of the body panel of an automobile, the panel being formed with a recess 26 around the door-opening. The outer panel of the car door is shown at 27 and at 28 and 29 are shown the usual spaced double-panels running around the door edge, whilst at 30 is shown the usual peripheral flange which, when the door is shut, fits into the recess 26.

Secured to the edge of the door, for example by gluing, is a strip of rubber 31 or like material which can be pinched between the flange and recess so as to exclude dirt, dust, draughts and rain from entering the car. The strip has a portion 32, intended to be pinched between the door and body and a rib 33 which can be engaged between the hooks 13A and 14A of the fastener described above.

Gluing alone is insufficient to give the desired security and in order that the strip can be attached more positively to the door edge, the latter is formed with a plurality of spaced holes, such as that shown at 34. Several of the fasteners are then engaged on the rib 33 by being slid on to it or by compressing the rib 33 between the hooks, the spacing of the hooks, when the stud is unstressed, being such that the rib will just, and only just, slide in the hooks. The fasteners are adjusted along the length of the rib so that the studs of the several fasteners can be successively snapped into the holes 34 to hold the rubber strip in its correct position around the door edge. Alternatively the fasteners may be first snapped into the holes, and the rib then forced into the hooks.

The shape and size of each fastener, relative to that of each hole, is such that when in the hole the limbs 19 and 20, and thus the hooks 13A and 14A also, remain pinched together a little so that the rib 33 is permanently under compression within the hooks. In this way the strip is prevented from being disengaged from the fasteners and the rubber strip adds its tension to that of the fasteners thereby further increasing the grip of each fastener on the strip.

It will be seen from Figure 7 that the inner wall 29 of the door-edge runs up at a slope 35 towards the outer panel 27. It is to avoid fouling this portion of the door that the axis 23 (Figure 3) of the stud of each fastener is inclined obliquely to the base axis 24.

It is partly for the same reason that the shoulders 15, 15A and 16, 16A are provided on each fastener. Owing to the unusual inclination of the stud to the base, the elbow 21 tends to lose its snap-action, but owing to the presence of the shoulders it is far more difficult, well-nigh impossible in fact, to get the fasteners out of their holes once they have been snapped in. I have found that if the central portion 12 of the blank were made of uniform width right up to the end portions 13 and 14, the finished fasteners come out of their holes too easily. On the other hand, it is permissible to provide shoulders on one limb only, as shown in Figure 8, for example. In the fastener 36 illustrated in this figure, it is only the rectilinear limb 37 which is provided with sloping shoulders 38 and 39, the elbowed limb 40 having parallel edges right up to the hook 41.

Figure 9:
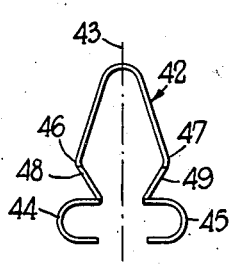

The fastener 42 shown in Figure 9 is symmetrical about the axis 43, has two equal hooks at 44 and 45 and has elbows 46 and 47 and sloping shoulders 48 and 49 on both limbs.

Such a fastener may be used where there is no asymmetrical obstruction to be avoided such as the sloping part 35 of Figure 7.

What I claim is:

1. A resilient fastener comprising a single rectangular strip of metal having bends about a series of parallel lines so that its central portion is in the form of a U-shaped stud with a snap-engaging elbow and having its ends in the form of a pair of opposed inwardly directed hooks, and the strip also having at the junction of the stud with each hook, cut-away portions constituting sloping shoulders, the narrower portion of each shoulder being adjacent a hook.

2. An assembly as claimed in claim 1, wherein the major axis of the U-stud is obliquely inclined to the major axis of the hooks.

References Cited in the file of this patent

UNITED STATES PATENTS

| | | |
|---|---|---|
| 2,139,329 | Fessler | Dec. 6, 1938 |
| 2,219,382 | Conlon | Oct. 29, 1940 |
| 2,263,806 | Hammerl | Nov. 25, 1941 |